F. E. ZAISS.
MACHINE FOR MAKING SPIRAL STICK CANDY.
APPLICATION FILED SEPT. 11, 1918. RENEWED JUNE 13, 1921.
1,400,127.
Patented Dec. 13, 1921.
10 SHEETS—SHEET 1.
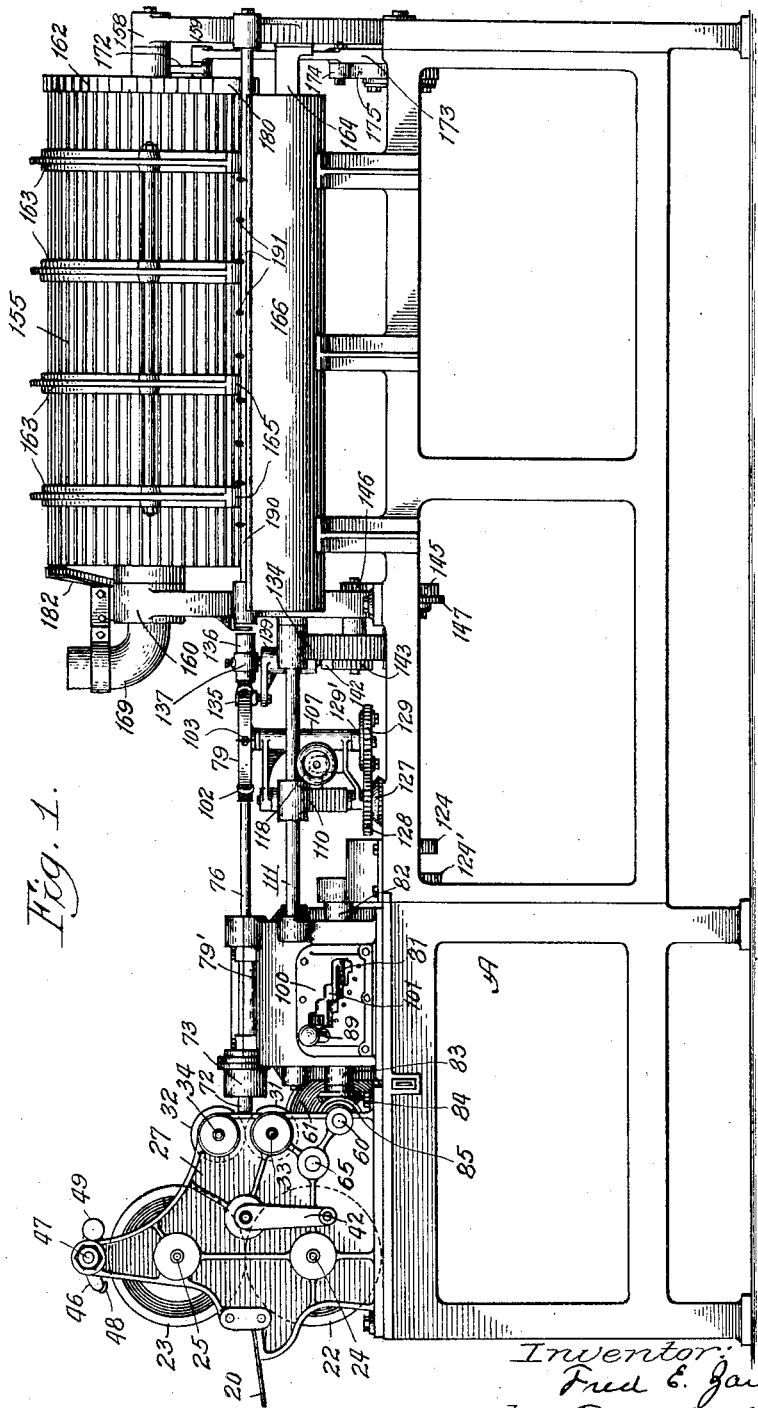

F. E. ZAISS.
MACHINE FOR MAKING SPIRAL STICK CANDY.
APPLICATION FILED SEPT. 11, 1918. RENEWED JUNE 13, 1921.
1,400,127.
Patented Dec. 13, 1921.
10 SHEETS—SHEET 2.
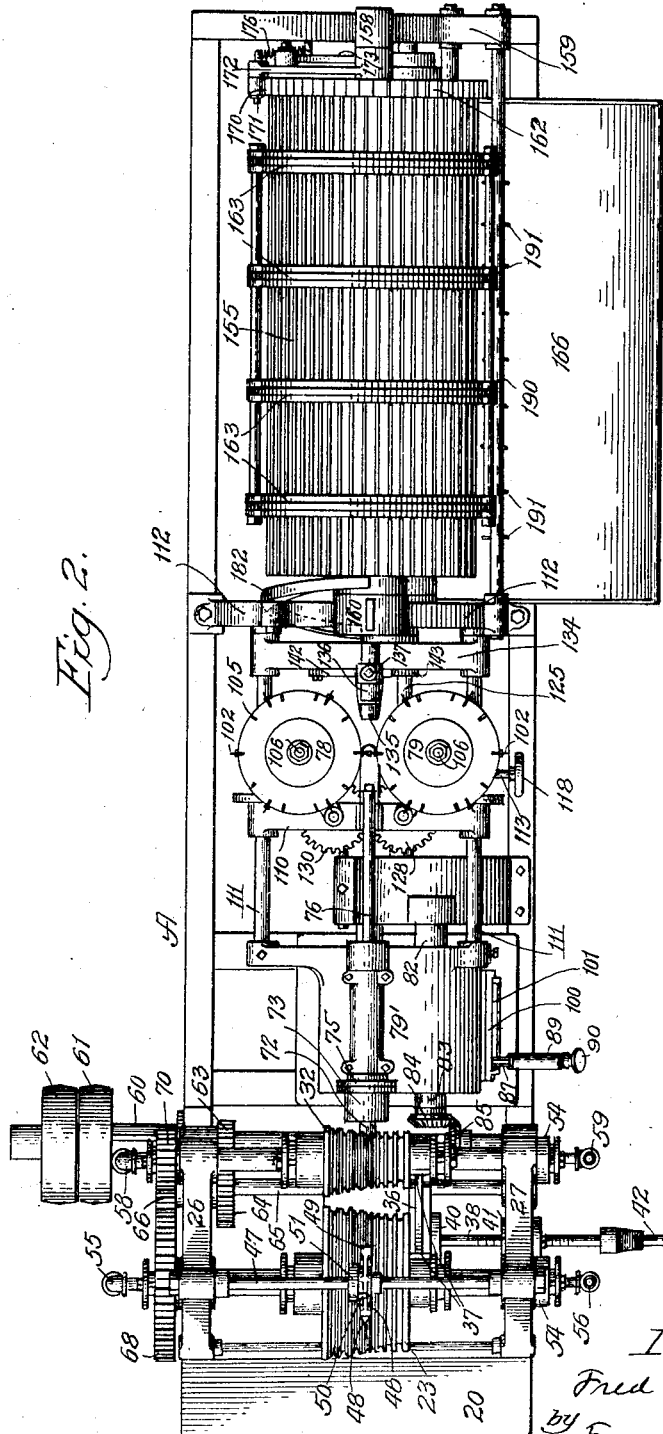
Inventor:
Fred E. Zaiss
by Fred Gerlach
his Atty.

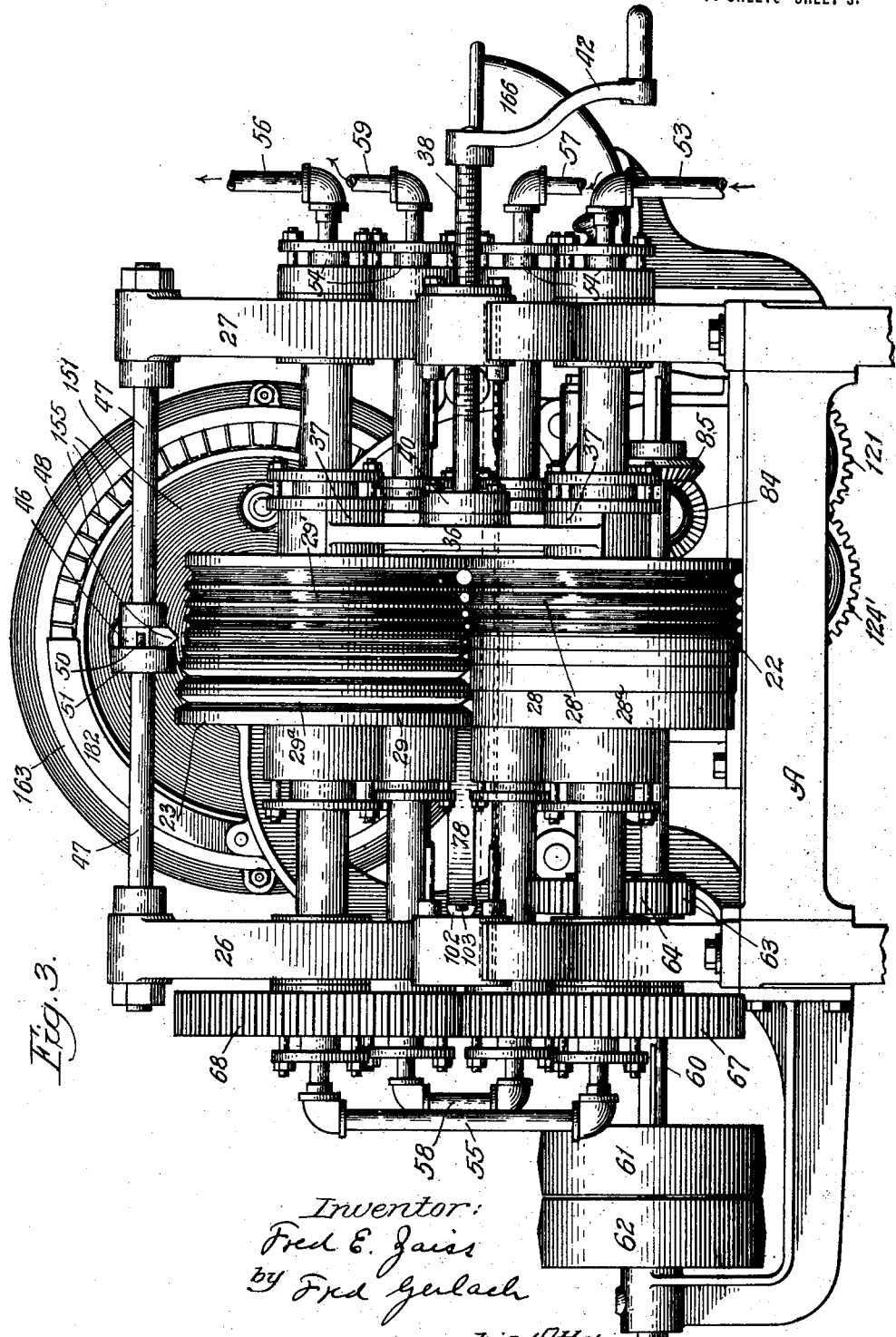

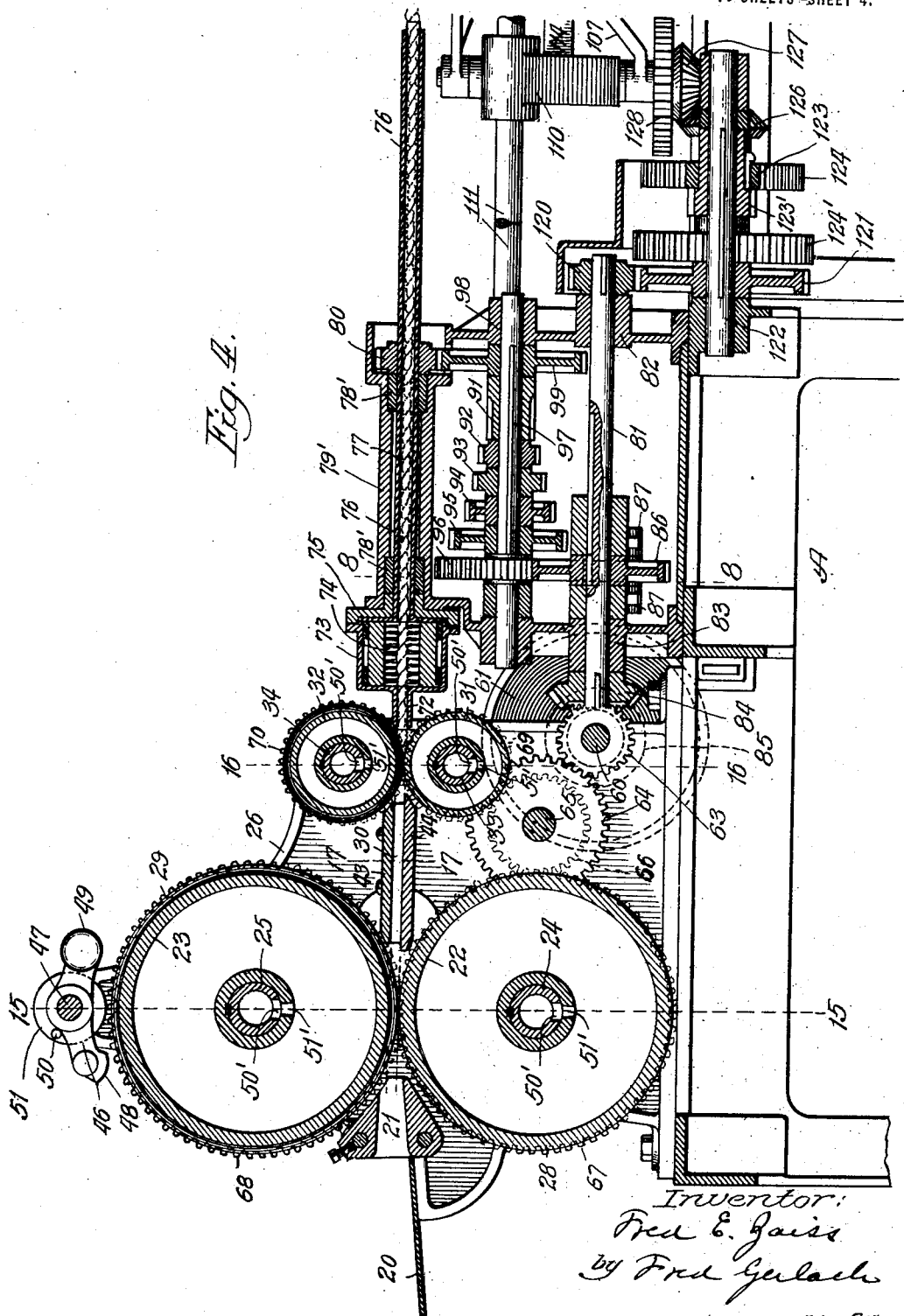

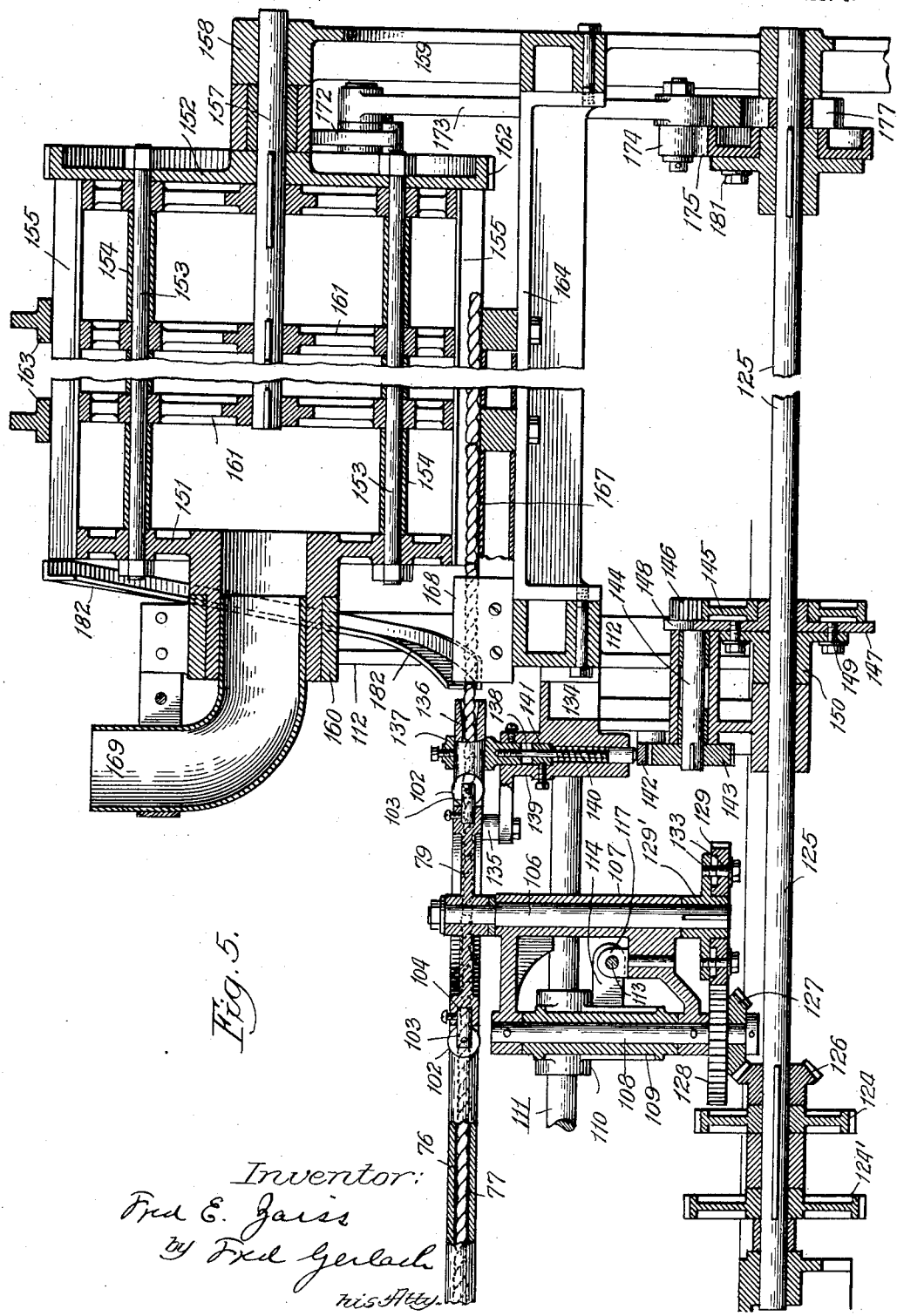

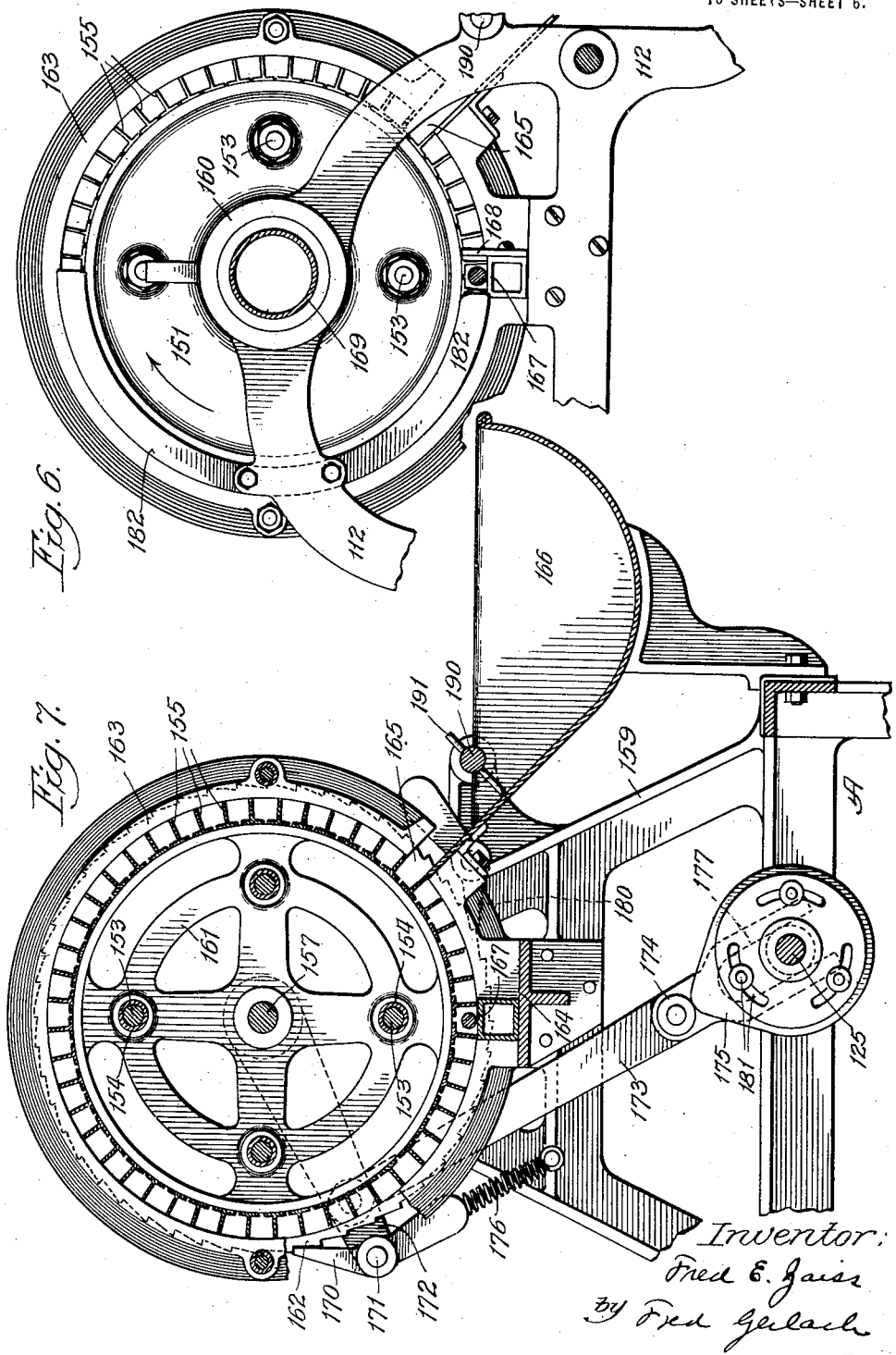

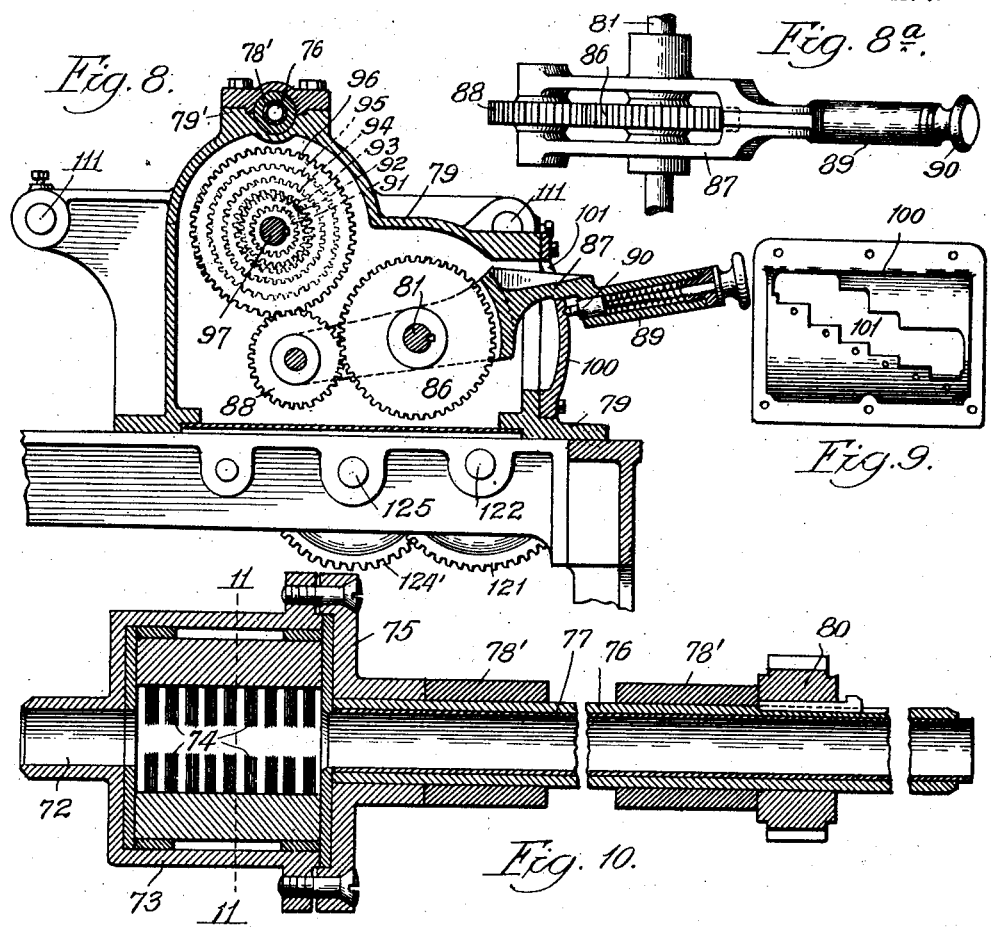

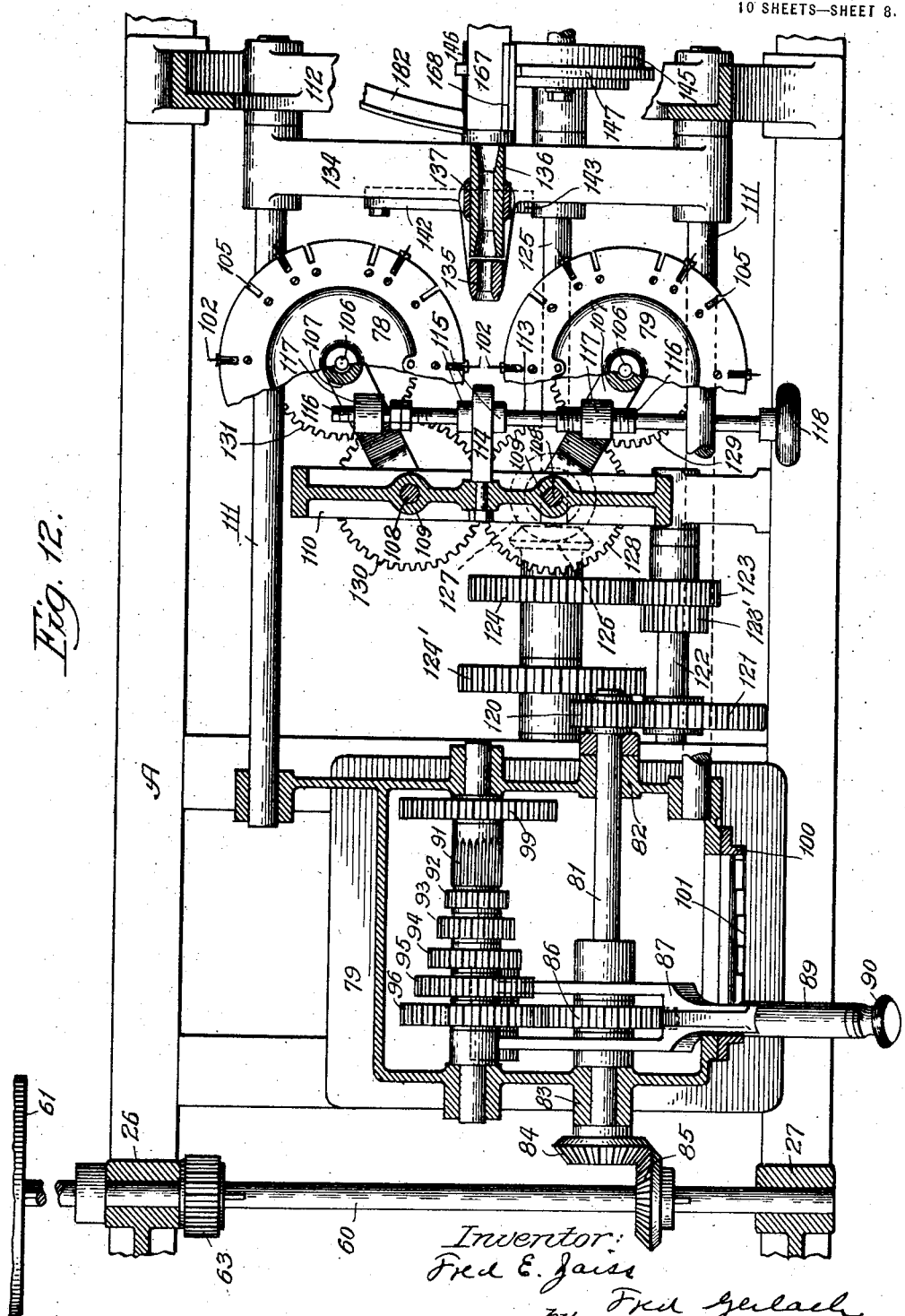

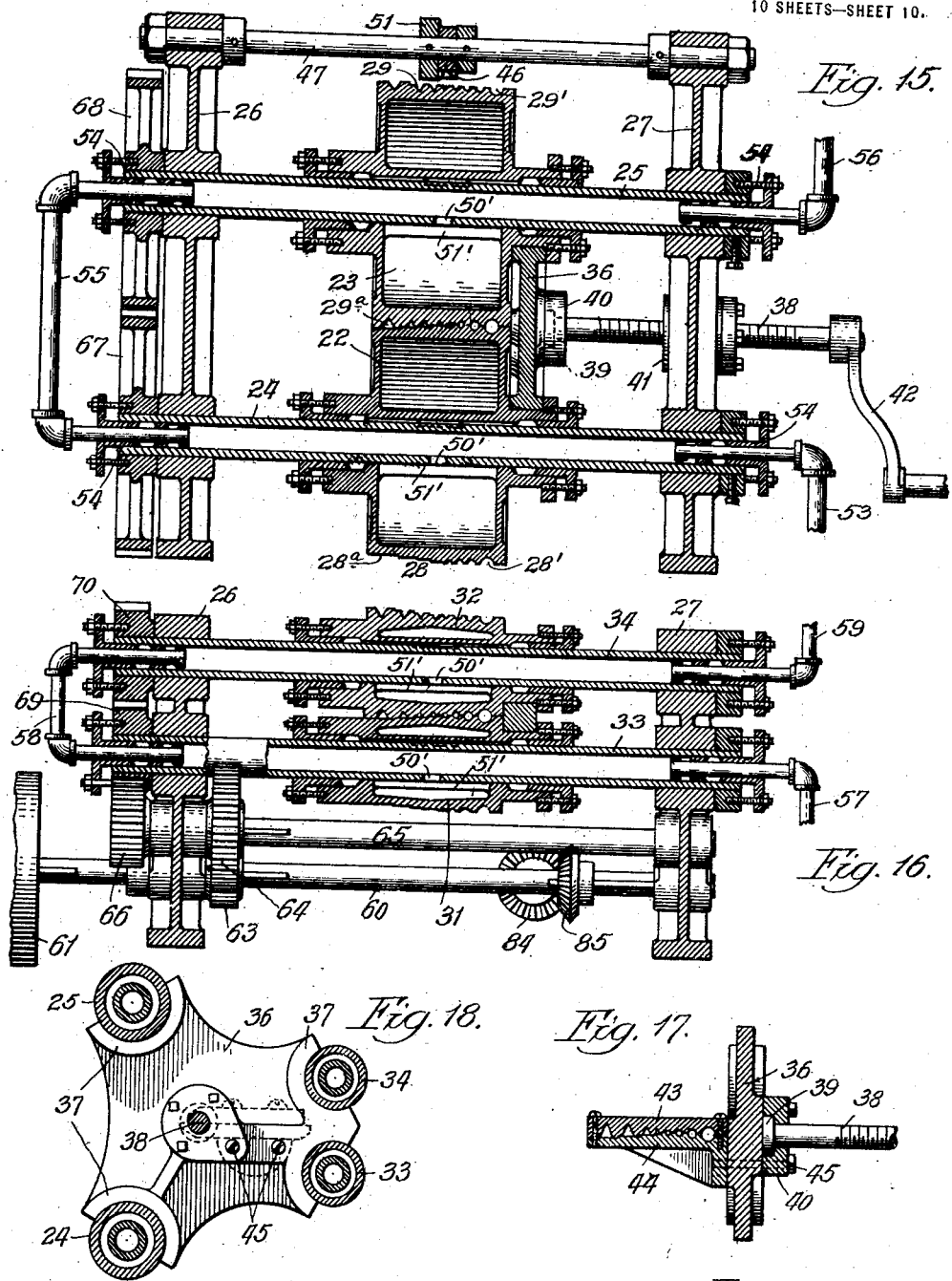

UNITED STATES PATENT OFFICE.

FRED E. ZAISS, OF CHICAGO, ILLINOIS.

MACHINE FOR MAKING SPIRAL STICK-CANDY.

1,400,127.  Specification of Letters Patent.  Patented Dec. 13, 1921.

Application filed September 11, 1918, Serial No. 253,563. Renewed June 13, 1921. Serial No. 477,345.

*To all whom it may concern:*

Be it known that I, FRED E. ZAISS, a citizen of the United States, and a resident of Chicago, in the county of Cook and State of Illinois, have invented certain new and useful Improvements in Machines for Making Spiral Stick-Candy, of which the following is a full, clear, and exact description.

The invention relates to machines for making spiral or twisted stick candy.

Heretofore, in making spiral stick candy, it has been the practice to feed to a twister sticks of certain length, usually as long as could be handled by the twister. The machines heretofore used, so far as I am aware, were not adapted for continuous operation, or to handle a continuous strip of candy.

One object of the present invention is to provide an automatic machine for making spiral stick candy. A result of such a machine is that a continuous strip of candy may be handled and twisted, and this results in an increase in capacity and the saving of much labor.

A further object of the invention is to provide an automatic machine for making spiral stick candy which may be readily adapted for sticks of different sizes and shapes.

A still further object of the invention is to provide an automatic machine of this character from which short sticks of commercial length will be delivered, and also one by which the length of the twisted sticks may be varied.

Another object of the invention is to provide a machine of this character with apparatus by which the twisted sticks will be dried before leaving the machine.

Other objects of the invention will appear from the detailed description.

The invention consists in the several novel features and combinations of parts hereinafter set forth and more particularly defined by claims at the conclusion hereof.

Figure 13:
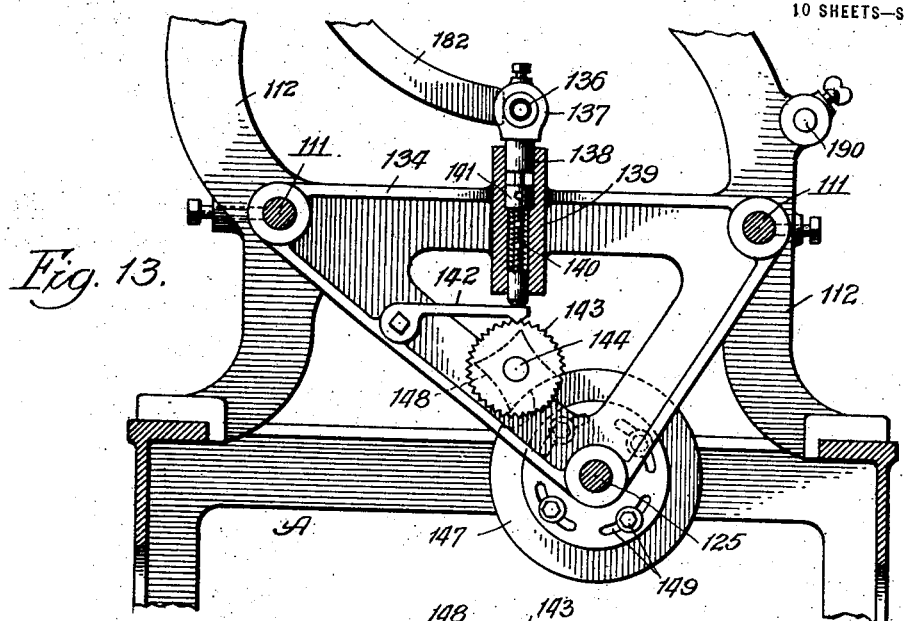
Figure 14:
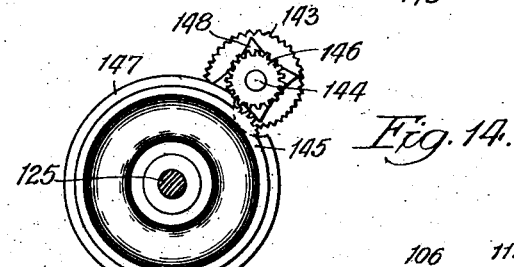
Figure 14A:
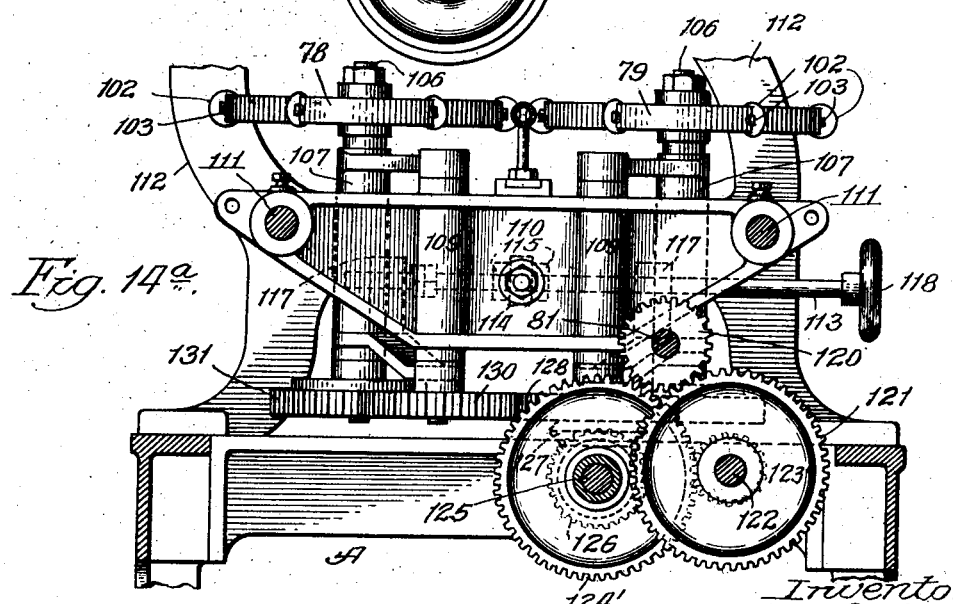

In the drawings: Figure 1 is a side elevation of a machine embodying the invention. Fig. 2 is a plan. Fig. 3 is an end elevation. Fig. 4 is a central longitudinal section of a portion of the machine. Fig. 5 is a central longitudinal section of the remainder of the machine. Fig. 6 is an end elevation of the drying apparatus. Fig. 7 is a transverse section taken through the drying drum. Fig. 8 is a section taken on line 8—8 of Fig. 4. Fig. 8$^a$ is a detail plan of the lever in which the movable gear for varying the speed of the twister is mounted. Fig. 9 is a detail of the plate for locking the speed adjusting lever for the variable speed twister driving mechanism. Fig. 10 is a longitudinal section through the twisting brush and its hollow shaft. Fig. 11 is a section taken on line 11—11 of Fig. 10. Fig. 12 is a plan, parts being shown in section, of the mechanism for indenting the sticks and the mechanism for driving the same. Fig. 13 is a detail of the mechanism for tapping the lengths of twisted candy, to break them at the indented points. Fig. 14 is a detail of the driving mechanism for said tapping mechanism. Fig. 14$^a$ is a transverse section showing the marking mechanism in elevation. Fig. 15 is a transverse section taken on line 15—15 of Fig. 4. Fig. 16 is a section taken on line 16—16 of Fig. 4. Fig. 17 is a section taken on line 17—17 of Fig. 4. Fig. 18 is a detail of the adjusting bracket shown in Fig 17.

The several mechanisms of the machine are supported upon a main frame A. The machine comprises generally, rolls by which a continuous strip of candy will be shaped and fed to the machine. These rolls are designed to give the stick whatever shape may be desired, for example, triangular or round. The machine also comprises combined gripping and feed-rolls for continuously feeding the strip to the continuously operating twisting mechanism. From the feed rolls, the sticks are fed to a twister by which the desired helical or spiral formation or stripping will be given to the candy. From the twister, the lengths of candy pass to indenting mechanism, which marks the lengths to correspond to the commercial length of sticks and from this indenting mechanism, the lengths are delivered into drying apparatus. The sticks are then broken at the indented points, so that finished and dried twisted sticks of commercial size will be delivered from the machine. In other words, the machine is adapted to automatically form a stream or continuous length of candy into finished twisted sticks of commercial length.

The continuous length or stream of candy passes from a suitable supply over a table 20 and through a nozzle 21 to a pair of continuously rotating coacting shaping and feed rolls 22 and 23 (Figs. 3, 4 and 15). The lower roll 22 is slidably mounted upon, and rotatable with, a hollow shaft 24 and the upper roll 23 is similarly mounted upon a hollow shaft 25. These shafts are mounted in brackets 26 and 27 which are secured on the main frame A. These rolls are provided with peripheral grooves or surfaces 28 and 29 which are adapted to shape the continuous strip of candy into the desired form and size or diameter. In practice, some twisted candy is round and the grooves 28' and 29' are adapted to so shape the continuous strip of candy and the grooves 29$^a$ on the roll 23, coacting with the cylindrical surfaces 28$^a$ on the lower roll 22, are adapted to shape the stream or length into triangular form of different sizes. From the rolls 22 and 23, the strip of candy passes through a suitable guide 30 (Figs. 4 and 17) to a pair of combined gripping and feed rolls 31 and 32. This guide 30 is formed of upper and lower sections 43 and 44 between which passages are formed corresponding substantially to the different shapes given to the candy by the shaping rolls. This guide is secured by screws 45 to the inner side of an adjusting bracket 36. Roll 31 is slidably mounted on and rotatable with a hollow shaft 33 and roll 32 is similarly mounted on a hollow shaft 34 (Figs. 4 and 16). Shafts 33 and 34 are mounted in suitable bearings in frame-brackets 26 and 27. Rolls 31 and 32 are grooved similarly to the shaping rolls 22 and 23 so they will be adapted for handling all of the shapes and sizes formed by the shaping rolls.

In the exemplification of the invention illustrated, the twister is designed to operate around a fixed axis and the shaping rolls and feed rolls and guide 30 are conjointly and transversely adjustable on their respective shafts, to permit any of the grooves in these rolls to be brought into position to deliver the candy to or into alinement with the axis of the twister. For this purpose, the shaping and feed-rolls are slidable on their respective shafts, so they may be adjusted transversely and so that they will be rotated by their shafts in any of the adjustments. For the purpose of effecting conjoint adjustment of all of the rolls, a bracket 36 is fitted with terminals or forks 37 (Figs. 3, 17 and 18) for engaging grooves in the hubs of the rolls 22, 23 and 31 and 32 respectively, and a screw 38, which is provided with an crank 42 and screw-threaded to a sleeve 41, which is fixed in bracket 27 and has its inner end provided with a flange 39, which is rotatably held in a cap 40 on adjusting bracket 36, so that longitudinal adjustment of the screw, effected by rotation of the crank 42, will conjointly shift all of the rolls and guide 30. As a result of this construction, the shaping rolls and the combined feed and gripper rolls and the intermediate stationary guide may be conjointly adjusted to bring strips of different shapes into correct position to deliver the stick to the twister.

To guide the operator in truly positioning the desired grooves of shaping and feed rolls into alinement with the axis of the twisting mechanism, a gage 46, is pivotally held on a cross-rod 47 which is supported in brackets 26 and 27 (Figs. 3, 4 and 15). This gage is provided with a finger 48 having a pointed edge which is adapted to be swung downwardly into either of the grooves 29', 29$^a$ in the upper roll 23 to determine whether the center of the groove is in alinement with the axis of the twisting mechanism. The gage is provided at one side of its pivot with a weight 49 which is adapted to normally hold the gage inoperative and against a stop 50 on a collar 51 on rod 47.

In practice, it is necessary to heat the shaping and feed rolls, and for this purpose, the shafts 24 and 25 for the rolls 22 and 23 and the shafts 33 and 34 for the rolls 31 and 32 are hollow and steam is circulated through them and an opening 50' (Fig. 16) is formed in each of these shafts and an elongated opening 51' in the hub of each of said rolls communicating with an opening 50' in all the transverse adjustments of each of these rolls will conduct steam from the shafts into the rolls respectively. Steam is supplied into the shaft 24 for the roll 22 by a pipe 53. A pipe 55 conducts steam from the other end of shaft 24 into one end of the shaft 25 and an exhaust pipe 56 is connected to the other end of the shaft 25. Pipe 57 supplies steam to one end of the hollow shaft 33 of roll 31 (Fig. 17) and a pipe 58 conducts steam from the other end of the shaft to one end of the shaft 34 for the roll 32. An exhaust pipe 59 is connected to the other end of shaft 34. These shafts and steam pipes are connected by suitable packing boxes 54.

Rolls 22 and 23 and 31 and 32 are continuously driven to supply material to the twisting mechanism. The driving mechanism for these rolls comprises a transverse shaft 60 (Fig. 12) which is provided with fixed and loose pulleys 61 and 62. A pinion 63 meshes with a gear 64 on a shaft 65 which is mounted in brackets 26 and 27 and is provided at one end with a pinion 66. Intermeshing gears 67 and 68 on the shafts 24 and 25 respectively are driven by pinion 66 which meshes with the gear 67. Intermeshing gears 69 and 70 on shafts 30 and 34 respectively are also driven by pinion 66 which meshes with the gear 69. This driving mechanism serves to operate the shaping and the feed rolls continuously.

The candy issuing from the rolls 31 and 32 passes into a continuously rotating twister which comprises a tube 72 on a case 73 (Figs. 4 and 10) containing a brush 74 having bristles adapted to engage the periphery of the candy with sufficient friction to twist it into a spiral. This case 73 is secured to a head 75 on a hollow shaft 76 containing a brass liner 77. The twisted candy is guided by the rotating tube to a pair of combined indenting and advancing wheels 78 and 79. Tube 77 is provided to prevent the material from sticking in the twister. The hollow shaft 76 is mounted in wood bushings 78′ in a housing and support 79′, which is suitably and fixedly secured to the main frame A. At one end of the housing, a pinion 80 for driving the twister is secured to shaft 76. The hollow twister shaft supports the twisted candy in transit to indenting wheels, both before and after it has been severed from the strip. If desired, twisters for different sizes of candy may be used, the changes being possible upon removal of the top section of housing 79′.

In practice, it is desirable, in making different kinds of candy, to give different or more or less twist to the stick for the purpose of producing different effects and for this purpose, variable speed gearing is provided for operating the twister relatively to the feed of the candy. A shaft 81 mounted in the bearings 82 and 83 (Figs. 4, 8 and 12) has secured to one of its ends a beveled pinion 84 which meshes with a beveled pinion 85 which is fixed on and rotates with the shaft 60. A gear-wheel 86 is slidably mounted on and rotatable with the shaft 81. A lever 87 is pivotally mounted on the shaft 81 (Figs. 8 and 12) and is forked to straddle gear 86 so that it will be adapted to move said gear longitudinally on the shaft 81. A pinion 88 meshing with gear 86 is mounted in the inner forked end of the lever 87. The outer end of said lever is provided with a handle 89 and a spring-lock 90 (Fig. 8) adapted to secure the lever in either of its assigned positions. Gears 91, 92, 93, 94 and 95 and 96 of graduated sizes are fixed to a shaft 97 which is mounted in bearings 98 in the support 79′. A gear-wheel 99, meshing with pinion 80 on the twister shaft and fixed to shaft 97, drives the twister shaft. Lever 87 may be adjusted to bring pinion 88 into mesh with either of the gears 91 to 96 inclusive on the shaft 97 to cause the twister shaft to be driven at any of the speeds desired. A plate 100 (Fig. 9) has a stepped slot 101 formed therein to guide lever 87 into its respective positions. This construction exemplifies mechanism by which the speed of the twister, relatively to the feed-mechanism, may be varied to adapt the machine to twist different shapes of sticks and to vary the effect of the twisting upon the sticks.

Horizontally rotating wheels 78 and 79 (Figs. 2, 5 and 12) are provided with coacting markers 102 which are adapted to indent the continuous strip at points corresponding to the length desired in commercial sticks. These markers are in the form of disks which are rotatably mounted in pins 103 which are removably held in sockets 104 in wheels 78 and 79. Additional sockets 105 are formed in these wheels so that the strip of candy from the twister may be equidistantly marked to form commercial sticks of different lengths. These marker-wheels do not interfere with the rotation of the stick while it is within the grip of the twister and serve to draw the twisted length of candy to the drying apparatus and breaking mechanism. Wheels 78 and 79 are adjustably sustained so they may be brought into different spaced relations to adapt them for feeding strips of different thickness. For this purpose, the shafts 106 for the wheels 78 and 79 are respectively mounted in brackets 107 (Figs. 5 and 12) which are pivotally sustained by rods 108 which are pivoted to swing horizontally in bearings 109 in a bracket 110 which is supported on rods 111. The latter extend longitudinally and are sustained in the support 79′ and in a bracket 112 which is secured to the main frame A. An adjusting screw 113, which is held against longitudinal movement by collars 115, and a lug 114 carried centrally by bracket 110, is provided with screw-threads 116 engaging threaded collars 117 which are pivotally connected to the wheel-supporting brackets 107, respectively. By turning handle 118 on rod 113 the pivotally adjustable brackets 107 may be shifted inwardly or outwardly to space the wheels 78 and 79, which carry the markers, and thus adapt them for properly feeding and marking different thicknesses of candy. Shafts 106 for the wheels 78 and 79 respectively are adapted to be driven (Fig. 12) from the shaft 81 by a pinion 120 fixed to said shaft, a gear-wheel 121 on a longitudinal shaft 122 which is suitably mounted in a cross-bar of frame A a pinion 123 driven by shaft 122, a gear 124 meshing with pinion 123 and secured to a shaft 125 (Figs. 5 and 12), a beveled pinion 126 which meshes with a similar pinion 127 which is loose on one of the shafts 108 and drivably connected to a gear 128 which meshes with a gear 129 on one of the shafts 106 to drive the wheel 79. Gear 128 also meshes with a gear 130 which is loose on the other shaft 108 and meshes with a gear 131 which is secured to the lower end of the shaft 106 for the marker-wheel 78. An additional pinion 123′ is provided on the shaft 122 to mesh with a gear-wheel 124′ on the shaft 125 to drive the marking mechanism at a slightly slower speed relatively to the feed mechanism where the shortening of the twisted length is excessive. This construction exemplifies coacting rotary markers adapted to be adjusted into differently spaced relation for candy of different thicknesses. To provide for the correct timing between the markers and their mechanisms, a bolt-and-arcuate-slot-connection 133 is provided between each gear-wheel 129 and its hub 129'.

In transit from the marking wheels to the drying apparatus, the candy is tapped to cause it to be broken into lengths corresponding approximately to the circumference of one of the marker wheels. A supporting bracket 134 sustained by rods 111 is provided for the breaking mechanism. A stationary guide 135 (Fig. 12) is adapted to receive the candy from the wheels 78 and 79 and direct it into an intermittently vibratory guide 136 which is adjustably held in a collar 137 on a stem 138 which is guided in a socket 139 in bracket 134. The vibrator is pressed downwardly by a coil spring 140 (Figs. 5 and 13) interposed between the lower end of the stem 138 and a stop 141 in said socket. The lower end of stem 138 bears against an arm 142 which is adapted to engage a toothed wheel or tappet 143 which is secured to a shaft 144 which is mounted in a bearing in the bracket 134. This tappet wheel is intermittently operated at about the time a length of candy has passed through the marker wheels, to slightly tap or vibrate the marked and twisted strip, after it leaves the wheels 78 and 79, to cause the lengths to break at one of the indented points, by a mutilated gear-wheel 145 (Fig. 14), which is driven by shaft 125 with a pinion 146 fixed on the shaft 144. A disk 147 rotates with the mutilated gear 145 and is notched to cooperate with a star disk 148 on the pinion 146 to lock shaft 144 and the tappet wheel 143 between the intermittent movements. A bolt-and-arcuate-slot connection 149 between disk 147, to which gear 145 is connected, and a hub 150 on shaft 125, permits adjustment to accurately time the operation of the breaker. This construction exemplifies mechanism for vibrating or tapping the twisted and marked strip of candy to cause it to break at one of the indented or marked points, and form a length sufficient to form a series of sticks of commercial length. A bolt-and-slot connection 181 between cam 175 and its hub on shaft 125 provides for a time-adjustment to insure operation of the drum at the moment when the last length of twisted candy leaves the tube 136.

As the candy leaves the vibrator, it is not sufficiently dry to permit it to be handled or packed, and for this purpose, the candy is delivered into a rotating drum wherein it is dried, so that when it is delivered therefrom, it will be in condition to be packed. This drum is built up of inner and outer heads 151 and 152 and spiders 161, which are secured together in spaced relation by rods 153 and sleeves 154, a series of bars 155, which are T-shaped in cross section and form cells which open outwardly and are of sufficient length to receive a length of the twisted candy. These bars are fixedly secured to the peripheries of the heads 151 and 152 and spiders 161. The hub of head 151 is carried in a bearing 160 on bracket 172. A shaft 157 projects from the head 152 and is held in a bearing 158 (Fig. 5) in a bracket 159 on the main frame A. A ratchet wheel 162 is formed on the drum-head 152. The lengths of candy are held in the cells of the drum by rings 163 which are secured to and supported by a frame bar 164 (Fig. 7) and are open, as at 165, to permit the candy to drop out of the cells after it has been carried around in the drum and dried. As each length of candy drops out of one of the cells through openings 165, it will strike a series of breaker pins 191 on a rod 190. These pins are removably held in the rod 190, so that they may be placed approximately at the points where the length has been indented and according to the number of indentations on a length of candy. As the length strikes the breaker pins, it will be broken at the indented points into sticks of commercial length which will fall into the receptacle 166. As the candy reaches this receptacle, it will be in condition for commercial use because the sticks will be of the desired commercial size and will be sufficiently dry so they can be packed immediately.

The pieces of candy are guided into the lowermost cell by a shelf or table 167 at one side of which a plate 168 is secured (Figs. 5 and 6). A pipe 169 (Fig. 5) is connected to the hub of the drum-head 151 and is adapted to deliver air under pressure into the drum to effect quick drying of the candy, if desired. The drying drum is intermittently operated to successively bring the empty cells into receiving position by a pawl 170 which engages ratchet 162 and is pivoted, as at 171, to an arm 172 which is pivoted on the shaft 157 and is operated by a link 173. A roller 174 on said link is operated by a cam 175 to impart the operative stroke to the pawl and drum and a spring 176 is adapted to retract the pawl, arm 172 and link 173, the latter being forked, as at 177, to straddle the shaft 125. A dog 180 (Fig. 7), engaging ratchet 162, prevents retraction of the drum.

The operation of the machine will be as follows: Shaping rolls 22 and 23 and the gripping 31 and 32 and guide 30 will be first adjusted into position by screw-rod 38 to bring the grooves for giving the continuous strip of candy the desired shape and size, into alinement and into position to feed the shaped strip into the twister. The lever 87 will be adjusted to cause the twisting mechanism to be operated at correct speed to form the desired product or the desired twist in the product. Assuming the machine to be running, a continuous stream or strip of candy will then be fed through guide 20 to the rolls 22 and 23, thence through the guide 30 to the gripping and feed rolls 31 and 32. While the candy is passing through these rolls, it will be kept hot so it can be handled. From the rolls 31 and 32, the continuously advancing strip passes into the brush in the twister head and as soon as gripped thereby, it will be twisted as fast as it is fed forwardly from said rolls. During this twisting operation, the material is gripped or held against rotation by the rolls 31 and 32, so that the rotation of the twister head will twist the strip continuously, and after it has been twisted, the strip will rotate in and be guided by the hollow shaft 76. From said shaft, the strip passes into the grip of the marking disks 102 on the wheels 78 and 79 which feed the twisted strip longitudinally through the guide 135 and through the vibrator tube 136 into one of the cells of the drying drum. About the time that, or just before enough of the twisted strip of candy, to form a length, has been delivered into the cell, the vibrator is operated to tap the strip and cause it to break at one of the indented points made by a disk 102. When a cell has been loaded, the drying drum will be rotated one step and the succeeding strip from the continuously operated twister and feed mechanism will be delivered into the next cell and so on. As the drum rotates, a stationary cam 182 forces the projecting portions of the sticks longitudinally in the cells. The product will remain in the cells during nearly an entire revolution of the drum, during which it will be dried. When the loaded cells reach and fall through the openings 165 in rings 163, the finished lengths will strike the breaker-pins and be thereby broken into finished sticks of commercial length and the sticks will drop into the receptacle 166.

The invention exemplifies a machine for automatically producing spiral or twisted stick candy from a continuous strip of material and also one which is automatic and may be adjusted for different shapes and sizes of candy and to give more or less twist to the product; also one in which the product is delivered in condition to be immediately packed; also one in which manual handling of the product is avoided; and also a machine in which provision is made for varying the length of the finished sticks.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a machine of the character described, the combination of mechanism for shaping and continuously feeding a strip of material, means for twisting the strip, means for severing the twisted strip into lengths and means for severing the lengths into sticks of commercial size.

2. In a machine of the character described, the combination of heated mechanism for shaping and continuously feeding a strip of material, means for continuously twisting the strip, means for indenting the strip, and means for severing the strip to form lengths having a series of indentations therein.

3. In a machine of the character described, the combination of heated mechanism for continuously feeding and shaping a strip of material, mechanism for twisting the strip, mechanism for gripping the strip, and mechanism for severing the twisted strip into lengths.

4. In a machine of the character described, the combination of rolls for shaping and continuously feeding a strip of material, gripping rolls for the strip from the feed rolls, mechanism for twisting the strip, means for heating the shaping and gripping rolls to keep the material hot until it reaches the twisting mechanism, and mechanism for severing the strip into lengths.

5. In a machine of the character described, the combination of mechanism for shaping and continuously feeding a strip of material, twisting mechanism, mechanism for first indenting the twisted lengths, and mechanism for severing the indented twisted lengths from the strip.

6. In a machine of the character described, the combination of heated rolls for shaping and continuously feeding a strip of material, continuously operating twisting mechanism for the strip, mechanism for indenting the twisted strip, means for drying the product and means for breaking the dried product into sticks of commercial length.

7. In a machine of the character described, the combination of heated mechanism for shaping and continuously feeding a strip of material, twisting mechanism and wheels for indenting the twisted lengths and feeding them away from the twisting mechanism.

8. In a machine of the character described, the combination of heated mechanism for shaping and continuously feeding a strip of material, twisting mechanism, mechanism for indenting the twisted material, mechanism for severing the twisted strip into lengths, and mechanism for breaking the lengths into sticks.

9. In a machine of the character described, the combination of heated mechanism for shaping and continuously feeding a strip of material, twisting mechanism, mechanism for indenting the twisted lengths of material, and mechanism for tapping the strip to cause it to break at the indented points.

10. In a machine of the character described, the combination of mechanism for shaping and continuously feeding a strip of material, twisting mechanism, mechanism for indenting the twisted material, and mechanism for intermittently vibrating the twisted strip to cause it to break at the indented points.

11. In a machine of the character described, the combination of mechanism for shaping and feeding a strip of material, twisting mechanism, mechanisms for severing twisted lengths from the strip, drying apparatus to receive the twisted lengths and means to sever the lengths into commercial pieces after the lengths have been delivered into the drying apparatus.

12. In a machine of the character described, the combination of mechanism for shaping and continuously feeding a strip of material, twisting mechanism, mechanism to sever twisted lengths from the strip, drying apparatus to receive the twisted lengths, and mechanism for intermittently operating the drying apparatus to receive the product.

13. In a machine of the character described, the combination of mechanism for shaping and continuously feeding a strip of material, twisting mechanism, mechanism to sever twisted lengths from the strip, a drum to receive the twisted lengths and mechanism for intermittently operating the drum.

14. In a machine of the character described, the combination of mechanism for shaping and continuously feeding a strip of material, twisting mechanism, mechanism to sever twisted lengths from the strip, mechanism to separate the lengths into sticks, a drum to receive the twisted product, and mechanism for rotating the drum to successively receive the product.

15. In a machine of the character described, the combination of mechanism for shaping and continuously feeding a strip of material and adapted for different strips, twisting mechanism, driving mechanism for said mechanisms, means to vary the speed of one of said mechanisms relatively to the other, and mechanism for indenting the twisted lengths, adjustable to mark the lengths for different lengths of sticks.

16. In a machine of the character described, the combination of mechanism for shaping and continuously feeding a strip of material and adapted for different strips, twisting mechanism, driving mechanism for said mechanisms, means to vary the speed of one of said mechanisms relatively to the other, mechanism for indenting the twisted lengths, adjustable to mark the lengths for different lengths of sticks and mechanism to break the strip at indented points.

17. In a machine of the character described, the combination of mechanism for shaping and continuously feeding a strip of material and adapted for different strips, twisting mechanism, driving mechanism for said mechanisms, means to vary the speed of one of said mechanisms relatively to the other, mechanism for indenting the twisted strip adjustable to mark the lengths for different lengths of sticks, mechanism for severing twisted lengths from the strip, mechanism for breaking the lengths into sticks, and drying apparatus, adapted to receive the product to receive the length.

18. In a machine of the character described, the combination with rolls for shaping and continuously feeding a strip of material, twisting mechanism, driving mechanism for said rolls and said twisting mechanism, and means to vary the speed of the twisting mechanism relatively to the rolls to vary the twist.

19. In a machine of the character described, the combination with rolls for shaping and continuously feeding a strip of material, twisting mechanism, means to sever lengths from the twisted strip, driving mechanism for said rolls and said twisting mechanism, and means to vary the speed of the twisting mechanism relatively to the rolls to vary the twist.

20. In a machine of the character described, the combination with rolls for shaping and continuously feeding a strip of material, twisting mechanism, mechanism to sever twisted lengths from the strip, mechanism to indent the lengths, driving mechanism for said rolls, mechanism for driving the twisting mechanism, mechanism for driving the indenting mechanism, and means to vary the speed of the twister relatively to the rolls and the indenting mechanism.

21. In a machine of the character described, the combination of mechanism for shaping and continuously feeding a strip of material, twister mechanism, rotary coacting wheels provided with devices for indenting the twisted product without severing it, mechanism for driving said wheels, and means to adjust the wheels relatively to the stick.

22. In a machine of the character described, the combination of mechanism for shaping and continuously feeding a strip of material, twister mechanism, means to sever twisting lengths from the strip, rotary coacting wheels provided with devices for indenting without severing the twisted strip, mechanism for driving said wheels, and means to adjust the wheels relatively to the stick.

23. In a machine of the character described, the combination of mechanism for shaping and continuously feeding a strip of material, twisting mechanism for the strip, mechanism for indenting the twisted strip, mechanism for intermittently vibrating the strip to cause it to break at the indented points and a drum having cells therein into which the sticks are fed before the breaking mechanism is operated.

24. In a machine of the character described, the combination of mechanism for shaping and continuously feeding a strip of material, twisting mechanism for the strip, mechanism for indenting the twisted lengths, mechanism for intermittently vibrating the lengths to cause them to break at indented points, a drum having cells therein into which the sticks are fed before the breaking mechanism is operated, and mechanism for intermittently rotating the drum.

25. In a machine of the character described, the combination of mechanism for shaping and continuously feeding a strip of material, twisting mechanism for the strip, mechanism for severing the strip into lengths, means for severing the twisted lengths into sticks, a drum having its outside open and cells therein into which the sticks are fed, and rings having an outlet therein for holding the product in the cells.

26. In a machine of the character described, the combination with feed and shaping mechanism for a strip of material, mechanism for twisting the strip, a drying drum comprising a series of cells, mechanism for operating the drum to successively bring the cells into receiving position, means for retaining the sticks in the cells, and means permitting them to be discharged from the cells by gravity.

27. In a machine of the character described, the combination with feed and shaping mechanism for a strip of material, mechanism for twisting the strip, mechanism for severing the strip into lengths, a drying drum having its outer periphery open and comprising a series of cells, mechanism for operating the drum to successively bring the cells into receiving position, and rings for retaining the sticks in the cells, and provided with means to permit them to be discharged from the cells by gravity.

FRED E. ZAISS.